United States Patent
Goderis et al.

(10) Patent No.: US 6,813,255 B1
(45) Date of Patent: Nov. 2, 2004

(54) METHOD TO ASSIGN UPSTREAM TIMESLOTS AND CODES TO A NETWORK TERMINAL AND MEDIUM ACCESS CONTROLLER TO PERFORM SUCH A METHOD

(75) Inventors: Danny Jose Goderis, Relegem (BE); Rudy Georges Hoebeke, Deurne (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/391,622

(22) Filed: Sep. 7, 1999

(30) Foreign Application Priority Data

Aug. 24, 1999 (EP) .......................................... 99402105

(51) Int. Cl.[7] .............................................. H04B 7/216
(52) U.S. Cl. ...................... 370/335; 370/437; 370/441; 455/452.1
(58) Field of Search ................................ 370/335, 437, 370/441–443, 395.2, 395.21, 342; 455/450, 452.1, 452.2, 453

(56) References Cited

U.S. PATENT DOCUMENTS

| | | | |
|---|---|---|---|
| 5,604,733 A | 2/1997 | Hargrave | |
| 5,754,541 A | * 5/1998 | Glisic et al. | 370/335 |
| 5,844,894 A | 12/1998 | Dent | |
| 5,894,473 A | 4/1999 | Dent | |
| 6,072,784 A | * 6/2000 | Agrawal et al. | 370/311 |
| 6,278,701 B1 | * 8/2001 | Ayyagari et al. | 370/335 |

FOREIGN PATENT DOCUMENTS

| | | |
|---|---|---|
| EP | 0 876 008 A1 | 11/1998 |
| WO | WO 97/35410 | 9/1997 |

* cited by examiner

Primary Examiner—Charles Appiah
Assistant Examiner—James K Moore
(74) Attorney, Agent, or Firm—Sughrue Mion, PLLC

(57) ABSTRACT

A method to assign upstream timeslots and codes to a network terminal in a point to multipoint communications network includes assigning at least one code to the network terminal for inclusion within a network terminal grant assigning upstream timeslots to the network terminal. A medium access controller performs the method for assigning upstream timeslots and codes. The network terminal is adapted to extract codes from the network terminal grant, and to encode upstream data packets with codes before the upstream transmission of the encoded data packets, upon receipt of this network terminal grant.

23 Claims, 5 Drawing Sheets

METHOD TO ASSIGN UPSTREAM TIMESLOTS AND CODES TO A NETWORK TERMINAL AND MEDIUM ACCESS CONTROLLER TO PERFORM SUCH A METHOD

BACKGROUND OF THE INVENTION

The present invention relates to a method to assign upstream timeslots and codes to a network terminal, to a medium access controller to perform such a method, and to a network terminal.

A method of assigning upstream access codes, a medium access controller and a network terminal are already known in the art, e.g., from EP specification 0544 975. Therein a time division multiple access, hereafter abbreviated with TDMA, system is described wherein individual network terminals are assigned upstream timeslots for transmission of upstream data packets to a central station, by means of network terminal grants generated by a medium access controller incorporated within the communications network.

This method and system is, however, one-dimensional, taking only the time-division aspect into account. There is nothing mentioned how to generate a medium access control method for two-dimensional systems, where for instance both TDMA and code division multiple access, hereafter abbreviated with CDMA, are combined.

U.S. Pat. No. 5,894,473 describes a multiple access communications system and method using code and time division. The method comprises coding information signals with CDMA codewords to be transmitted over a common frequency spectrum, time compressing the CDMA code words for transmission only during allocated timeslots, activating a receiver only during the allocated timeslots to receive and decompress the time compressed CDMA codewords and decoding the decompressed CDMA codewords to recover the information signals. The allocation of the codes takes place locally in the network terminals themselves, for instance on the basis of physical level parameters such as the power level of the to be transmitted signals. U.S. Pat. No. 5,844,894 discloses that independent channel assignment strategies can be applied in different timeslots. These strategies are used between two base stations, corresponding to two central stations in the present invention, and not between the base station and the radio terminals themselves as is the subject of the present invention. Moreover, in the referenced U.S. patents, timing synchronization between the central station and the terminals is very important, as is reflected by the availability of the burst timing controller. There is also no indication within both U.S. patents how to centrally allocate these timeslots.

SUMMARY OF THE INVENTION

An aspect of the present invention is to provide a method and a medium access controller adapted to simultaneously and centrally allocate timeslots and codes to the user network stations within such a two-dimensional combined TDMA/CDMA communications network and capable to handle different degrees of synchronization between the central station and the user network terminal.

In this way, a generic two-dimensional medium access control protocol is provided wherein both the time slots as well as the codes are centrally assigned by the medium access controller to the individual network terminals, by means of a dedicated medium access control mechanism which is centralized within the network and for which a dedicated medium access control layer is used. Such a process of central assignment of timeslots allows much looser requirements of synchronization as will also become clearer from the descriptive part of this document.

In this way, the two-dimensional constraints related to the physical interferences between the network terminals, as well as between the individual communication channels are taken into account. This is extremely important for CDMA systems where these physical interferences limit the use of available codes. These physical interferences may include Rayleigh fading, and multi-user interferences.

By taking into account the total load within the network, for allocating upstream timeslots and codes, efficiency and throughput are optimized.

By letting this load to be dependent on individual requests transmitted by the terminals, these requests being indicative of the amount of upstream data packets the network terminals intend to transmit, a simple and effective method for determining the load is provided.

When the time and code allocation is dependent on a delay parameter, a compromise between throughput within the network and delay requirements pertaining to individual connections is obtained.

This delay parameter can as well be based upon the requests transmitted by the individual network terminals, or it may be generated from the connection admission control parameters, as will become clear from the descriptive part of this document.

A selection is made from a plurality of code allocation procedures. This selection and subsequent performance of the selected procedure on one hand allows to remedy specific problems within the network, while at the same time aiming to compromise parameters as throughput and fairness.

A first procedure is focussed on optimizing throughput by reducing the load within the network. A second procedure is focussed one on fairness, thereby allowing as much as possible network terminals to be served simultaneously. A third procedure represents a compromise between the previous two, and a fourth procedure guarantees delay boundaries for instance in case of guaranteed constant bit rate connections. In any of these procedures, the physical boundary conditions are taken into account.

In case some network terminals intend to transmit upstream data packets pertaining to connections for which some connection admission control parameters were negotiated during connection set-up, the second and third procedures thereby allow to take these connection admission control parameters into account. The total result is that a generic medium access control method is provided taking into account a maximum of parameters related to the physical medium, the load within the network, delay constraints and quality of service parameters.

By executing the method at predetermined time intervals, which in general correspond to the TDMA timeslots, at each timeslot a multipermit or multigrant is generated whereby thus one or more terminals are assigned one or more codes for subsequent upstream transmission of data packets to the central station.

The method is thereby not only applicable for generating grants per network terminal, but allows generating multipermits per service category queues per terminal.

BRIEF DESCRIPTION OF THE DRAWINGS

The above and other aspects and features of the invention will become more apparent and the invention itself will be best understood by referring to the following description of an embodiment taken in conjunction with the accompanying drawings wherein.

DETAILED DESCRIPTION OF THE INVENTION

Figure 1:
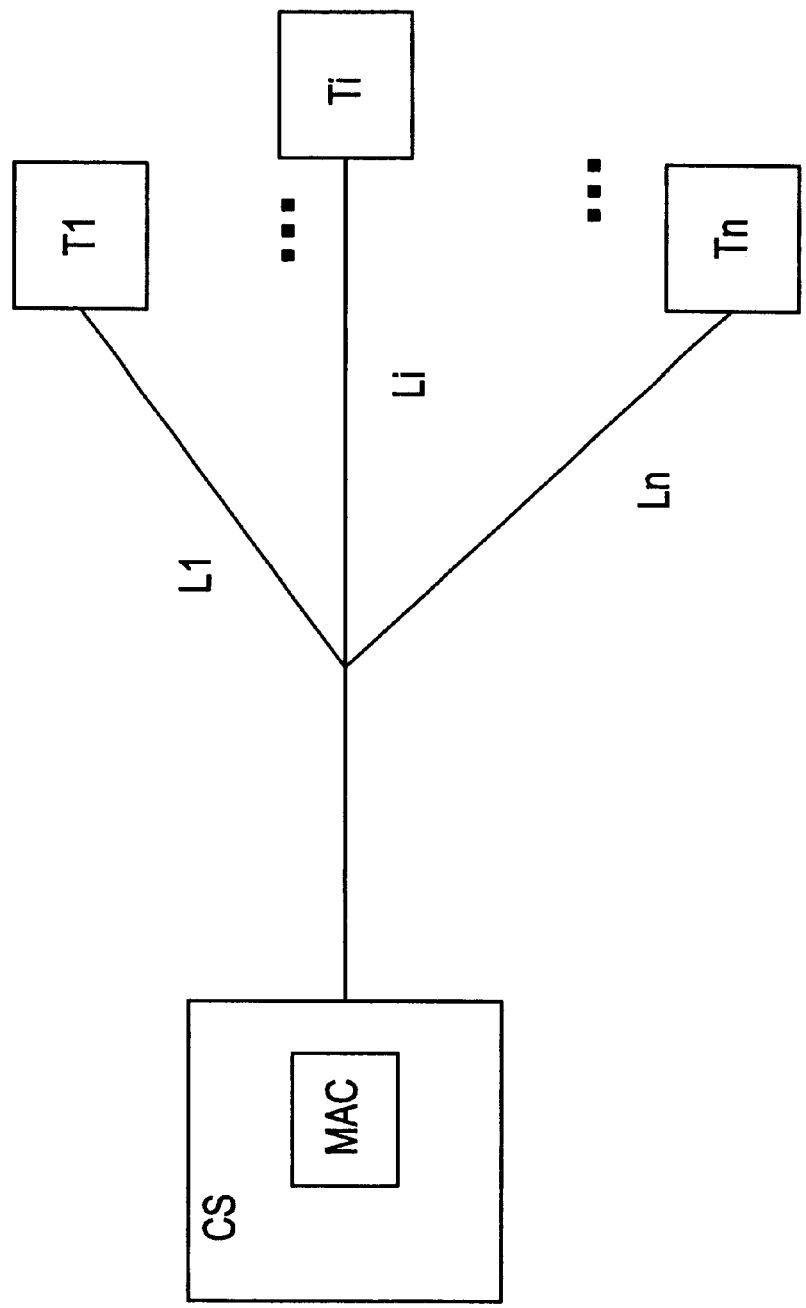
FIG. 1 represents a communication network according to the invention.

The communications network of FIG. 1 is composed of a central station CS and a plurality of network terminals T1, ..., Ti, ... to Tn. The central station is coupled to these network terminals via the cascade connection of a common transmission channel, e.g., a copper link for a power line communications, abbreviated with PLC, network, and respective individual network terminal channels L1, ..., Li, ..., Ln, also for instance comprising copper cables in the case of the aforementioned PLC network. In other environments, for instance, in UMTS networks which stands for Universal Mobile Telephony Services networks, the common transmission and individual channels comprising radio links. The network hence has a point-to-multipoint architecture in the downstream direction, which is the direction from the central station CS to the network terminals T1 to Tn, and a multipoint-to-point architecture in the upstream direction, i.e., the direction from the network terminals T1 to Tn towards the central station CS.

Networks having such a point-to-multipoint architecture in the downstream direction are the PLC and UMTS networks, but also satellite networks.

In the downstream direction, the central station CS broadcasts information to all network terminals T1 to Tn. In PLC networks, this information is packed in the downstream frames. In the opposite direction, the network terminals T1 to Tn commonly share the common transmission channel in a time-multiplexed way. This means that different network terminals transmit information to the central station CS in different timeslots. Each network terminal thus sends upstream information in short bursts to the central station. The upstream timeslots constitute the upstream frames for the aforementioned examples of UMTS and PLC networks.

Figure 2:
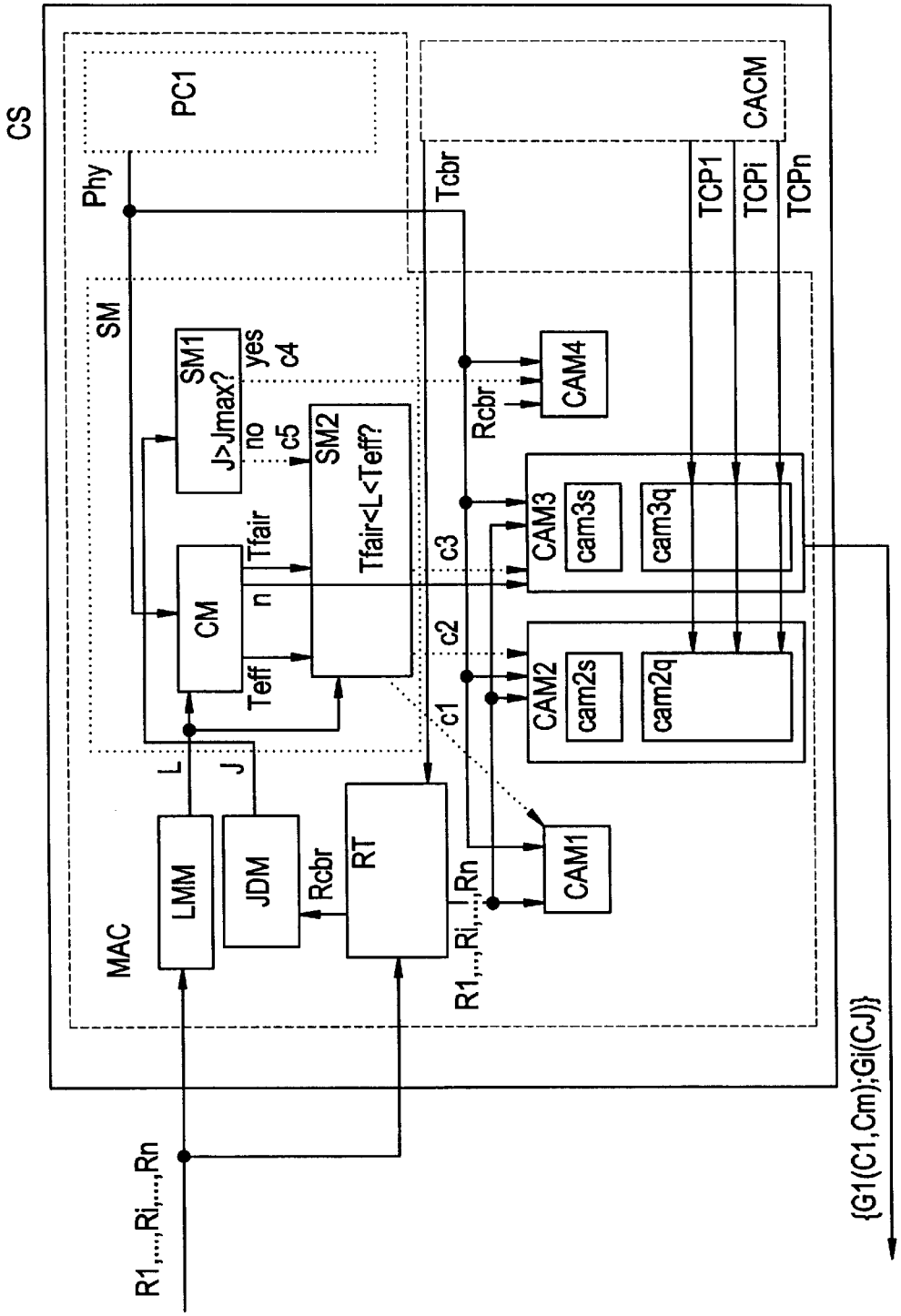
FIG. 2 represents the central station of the communications network of FIG. 1, including a medium access controller according to the invention.

To be allowed to send a burst in an upstream timeslot, a network terminal, for instance Ti, has to receive a permission or network terminal grant from medium access controller MAC, usually included within the central station CS, as is also drawn in FIG. 2.

At regular time intervals, such permissions are broadcasted downstream by this medium access controller, for instance by means of a dedicated cell. In these dedicated cells, the contents of grant fields precisely define which network terminal is allowed to occupy which upstream timeslot. To increase the amount of users or network terminals within these networks, the transport channel is further divided into sub-channels according to orthogonal codes. This results in a combined TDMA/CDMA access mechanism that can be used for the UMTS, PLC and satellite networks. This means that the same frequency band for transmission can be shared by a multitude of network terminals by coding the information such that transmitter and receiver can only discriminate the data on the basis of the code. As is known in the art, the orthogonality is not always guaranteed, especially in the presence of Doppler effect, terminal interference, etc., where data coded differently is corrupted and misinterpreted as originating from another terminal.

Traditionally, these codes are allocated for the duration of the communication itself Due to the interference effects, the amount of codes that can actually be allocated is limited and smaller than the amount of codes within the theoretically available plurality of codes. By allocating the codes per timeslot, thereby taking these physical interference effects, as well as the instantaneous load and delay within the network, into account at each of these timeslots, a more optimized code allocation procedure is obtained. This itself results in a more efficient usage of the transmission medium.

The present invention concerns a method for generating and assigning a network terminal grant associated to an individual network terminal Ti, which is part of the plurality of network terminals T1 to Tn, whereby at the same time also one or more codes are allocated to this network terminal. The present invention concerns a medium access controller MAC that is adapted for executing this method. This medium access controller has central functions and is, in most cases incorporated in the central station. However, it may also be a stand-alone unit residing somewhere centrally within the network.

Figure 4:
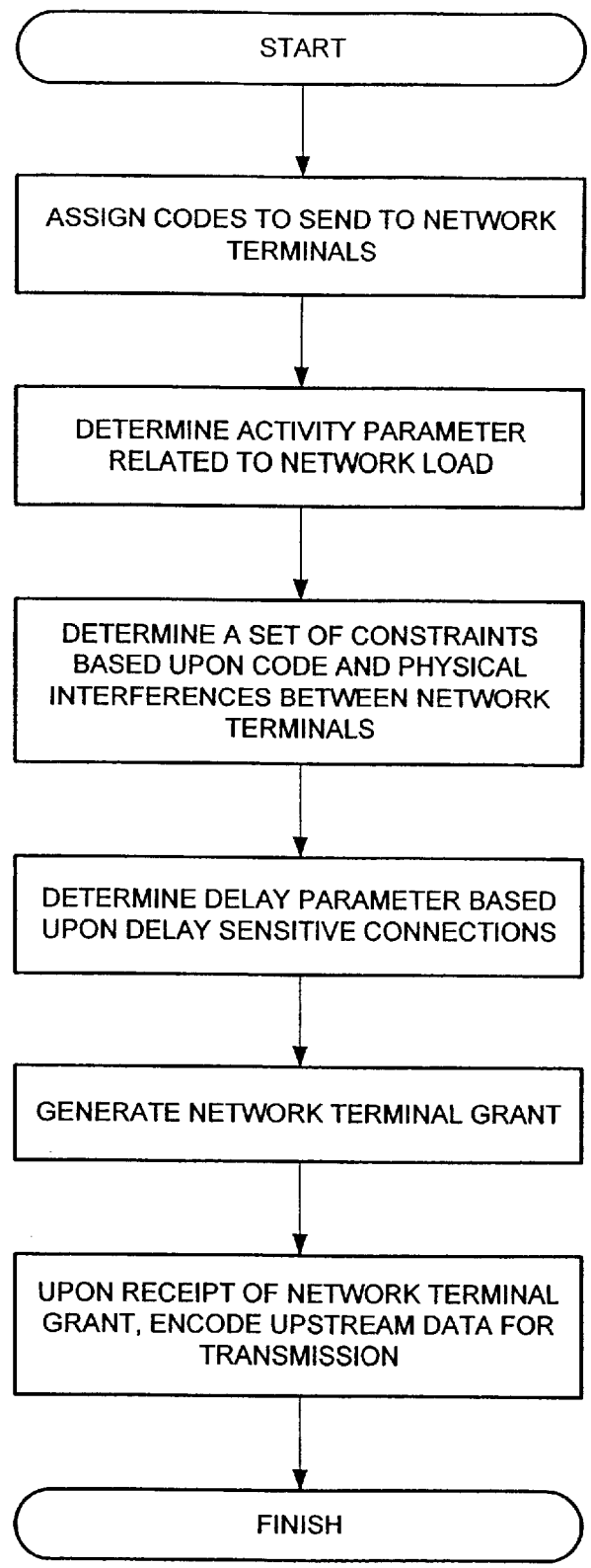
FIG. 4 represents an embodiment of the method of assigning terminal grants according to the invention.

A detailed embodiment of such a medium access controller is schematically depicted in FIG. 2, with a method of operation depicted in FIG. 4.

This medium access controller MAC includes a load monitoring means, denoted LMM adapted to determine an activity parameter denoted L and which is related to the load within the network. The term load is thereby to be understood as related to the amount of upstream data traffic individual network terminals intend to transmit. There are several possibilities to determine this load, and one method is a predictive method described in the non-published European Patent application 99401051.0, filed by the same applicant. Another method, as is depicted in FIG. 2, uses upstream requests earlier transmitted upstream by the individual network terminals to the medium access controller, and including information related to the amount of these upstream data packets these individual network terminals intend to transmit. This information can be the amount of data packets queued within these terminals, or may indicate that a certain threshold within such a queue is surpassed. These requests are denoted R1, ..., Ri to Rn and respectively indicate requests transmitted by T1, ..., Ti to Tn. The activity parameter L can be calculated from these requests in different ways, e.g., by counting together the amount of data packets, in case the requests indicate so. Other possibilities for calculating L can comprise counting these requests indicating a surpassing of the threshold.

The medium access controller MAC also includes a physical constraint means, denoted PCI, and adapted to determine from the available codes within the plurality of codes, from parameters related to the physical interference between the terminals and the individual network terminal channels, a set of two-dimensional constraints. These constraints are a set of mathematical expressions, to be considered as boundary conditions for the calculations further performed within other blocks in the medium access controller. The parameters related to the physical interferences between the terminals and the individual network terminal channels also incorporate the degree of synchronization between the network terminals and the central station. In this respect, the method can thus handle different degrees of synchronization since this will be represented by different values of the resulting set of two-dimensional constraints. The physical interference input parameters are in general stored within a memory in the PCI device itself, as well as the codes itself. The set of two-dimensional constraints generated by the PCI device, is denoted Phy.

The medium access controller MAC further includes a jitter determining means, denoted JDM. This jitter determining means is adapted to determine a delay parameter, relative to delay at some delay-sensitive connections within the network. Delay is only relevant to these connections with strict delay-bounds, such as the constant bit rate connections, for which strict delay parameters were initially agreed during connection set-up. The delay parameter J is calculated from traffic information only relative to these delay-sensitive connections. In case the network terminals have included the information with respect to these delay-sensitive connections within their request fields, the requests are also input parameters to the jitter determining means JDM. In case, such as is depicted in FIG. 2, information with respect to these delay sensitive connections, e.g., the constant bit rate connections, within the terminals, is not incorporated within the request fields, first a kind of pseudo constant bit rate requests are calculated from these specific connection admission control parameters, which are then consecutively transmitted to the jitter determining means which calculates the delay parameter denoted J from these pseudo constant bit rate requests Rcbr.

The pseudo constant bit rate requests Rcbr are generated within the request table, denoted RT, which is also incorporated in the medium access controller MAC. This request table temporarily stores all incoming requests, and also generates the pseudo constant bit rate requests from traffic and connection parameters pertaining to these constant bit rate connections. These traffic and connection parameters are centrally stored within the central station CS within a connection admission control memory, denoted CACM. This memory is continuously updated each time new connections are set-up, and contains the traffic and connection parameters pertaining to each of these connections. For the constant bit rate connections, the traffic and connection parameters are schematically denoted Tcbr in FIG. 2. The request table RT then is adapted to receive these Tcbr parameters and to generate therefrom the pseudo constant bit rate requests Rcbr. A possible way of doing so may be assigning a counter per constant bit rate connection, initializing this counter with the desired inter-arrival time of packets, as indicated by the traffic and connection parameters. Each upstream time slot this counter is decreased by one, whereby, if the counter reaches a zero value, a pseudo-constant bit rate request is generated.

The jitter determining means JDM then receives the pseudo constant bit rate requests Rcbr and calculates therefrom the delay parameter J. A possible method may be assigning another so-called delay counter to each of the constant bit rate connections, entries in each counter indicating the time passed since the last grant for a particular connection was given. This time can be expressed in timeslot units. The contents of this counter then represents a measure for the age of this particular connection. By then comparing the contents of all these delay counters, the delay parameter J can be chosen as the maximum value of all entries.

The medium access controller MAC, adapted to perform the medium access control method of the present invention, calculates at each upstream timeslot a multi-permit. Such a multipermit comprises of one or more network terminal grants, whereby each of the network terminal grants, e.g., G1 being a grant for network terminal T1, and Gi being a grant for network terminal T1, includes one or more codes allocated to this specific network terminal. In FIG. 2, an example of a multipermit generated at a particular timeslot comprises a network terminal grant G1 for terminal T1, this network terminal grant G1 itself including code C1 and code Cm allocated to T1, and a network terminal grant Gi for network terminal Ti, whereby Gi itself includes code Cj for allocation to network terminal Ti. In the embodiment of FIG. 2, these multipermits are generated by one of a plurality of code allocation means. However, other embodiments of a medium access controller according to the invention exist, whereby only one algorithm is used for generating such a multipermit.

Figure 5:
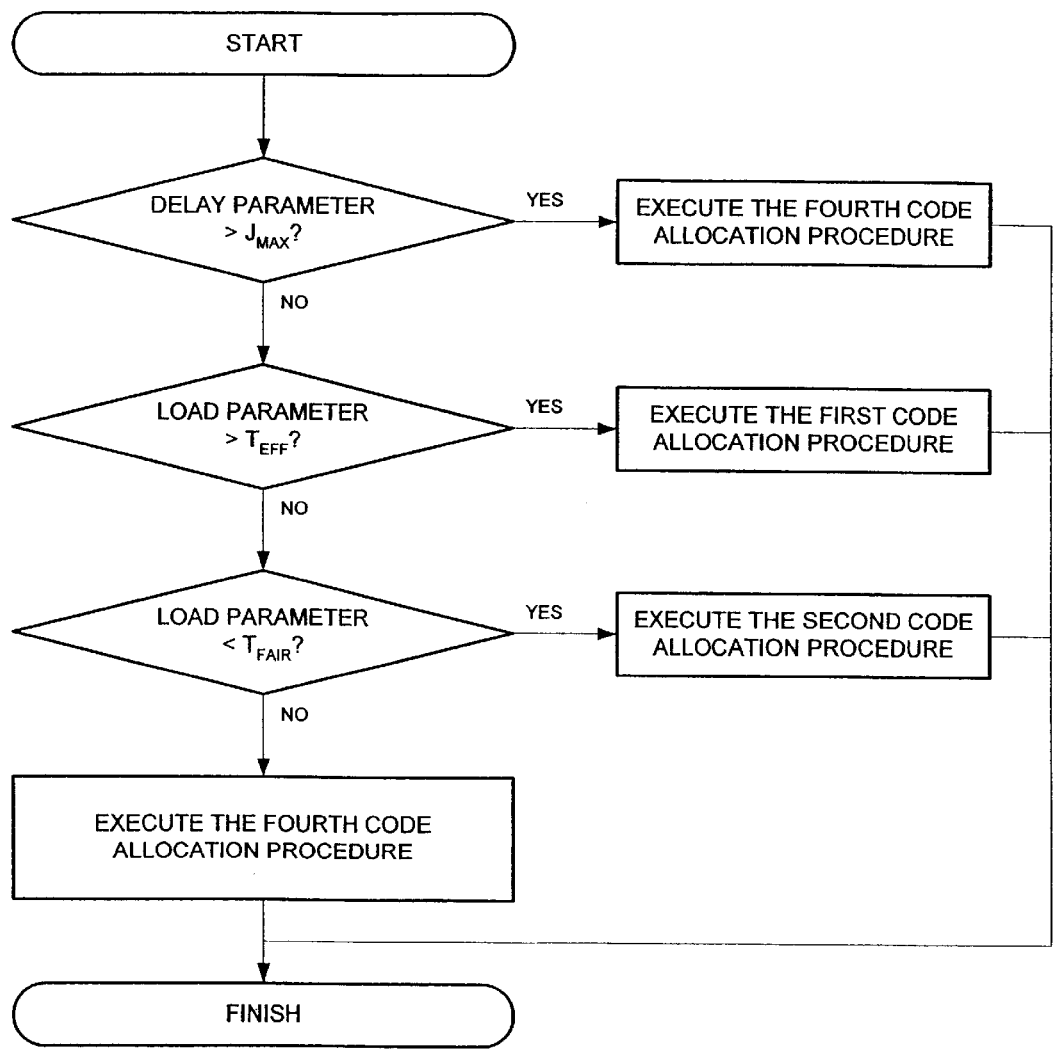
FIG. 5 represents an embodiment of code allocation procedures according to the invention.

In the embodiment depicted in FIGS. 2 and 5, 4 code allocation means are depicted and denoted CAM1, CAM2, CAM3 and CAM4. The selection means SM selects which one of the four code allocation means will at a particular timeslot generate the multipermit. This selection means SM selects one of the code allocation means based on the values of the load parameter, the delay parameter and the set of two-dimensional constraints, thereby generating specific control signals to the respective code allocation means, indicative of their selection and consecutive triggering or not. The selection is performed first by comparing the delay parameter J with a predetermined threshold value denoted Jmax. Jmax itself may be a system parameter calculated based on the delay bounds of all delay-sensitive connections. One possibility may be of selecting the most stringent value of all of these values as stored in the connection admission control memory CACM. This comparison takes place in a first comparing means denoted SM1 included within SM. If the delay parameter J exceeds Jmax, the fourth code allocation means is triggered, by means of the value of control signal c4 transmitted between SM1 and CAM4. In case the delay parameter is lower than or equal to Jmax, a second comparing means denoted SM2 is triggered by means of control signal c5 transmitted between SM1 and SM2. This second comparing means SM2 is adapted to receive the activity parameter L and to compare this with two predetermined threshold values denoted Tfair and Teff. In case L exceeds Teff, the first code allocation means CAM1 is triggered by means of control signal c1 generated by SM2 and transmitted to CAM1. In case the activity parameter L is smaller than Tfair, the second code allocation means CAM2 is triggered by means of a control signal c2 generated by SM2 and transmitted to CAM2. In case L lies between Tfair and Teff, the third code allocation means is triggered by means of control signal c3 generated by SM2 and transmitted to CAM3. The values of these predetermined threshold values Tfair and Teff themselves may be fixed parameters determined by the operator during initialization of the network and stored within SM2. In another embodiment, depicted in FIG. 2, these may also be dynamically updated during the operation on the basis of an average value of the activity parameter calculated so far, and on the basis of the set of two-dimensional physical constraints Phy generated earlier by the physical constraint means.

The calculation of the values of Teff and Tfair takes place in a calculation means, denoted CM, and also part of the selection means SM.

A possibility exists of selecting Tfair and Teff as a predetermined percentage of the available upstream bandwidth, for instance 50% for Tfair and 300% for Teff of this upstream bandwidth of the common transmission channel.

The different code allocation procedures performed by the distinct code allocation means CAM1 to CAM4 will now be described.

The first code allocation means CAM1 is adapted to generate multipermits such that the load within the network, and represented by the activity parameter L, is reduced as much as possible, while still taking into account the two-dimensional physical boundary conditions. The reason for this is that in this case the activity parameter, being a measure for the load, already exceeded predetermined threshold Teff, indicative of saturation within the network. In order to remedy this, the throughput is maximized by serving the terminals with the highest number of requests and by allocating as much as possible codes to these terminals. In an extreme case, all codes are allocated to one terminal for which most data packets are waiting. In another case, the available codes may be divided amongst the two most loaded terminals. The terminal that is used will depend on the physical boundary conditions. The first code allocation procedure is also called the efficient state algorithm. Input parameters for the first code allocation means CAM 1 are thus the requests R1, . . . , Ri to Rn, provided by the request table RT, and the set of two-dimensional constraints Phy provided by PCI.

The opposite case occurs when the load is lower than the other predetermined threshold Tfair. In this case, fairness may become the primary goal, whereby as much as possible terminals, representing a first maximum amount of these network terminals, are served in a fair way, e.g., by means of a round robin procedure. This algorithm thereby also maintains information about the terminals that were served during the preceding time slot, still taking into account the set of two-dimensional constraints Phy. This second code allocation procedure, performed by the second code allocation means CAM2, is therefore also called the fair state algorithm. Input parameters again comprise of the requests from the request table and the set of two-dimensional constraints Phy.

In the case that the activity parameter L lies between the two predetermined thresholds Teff and Tfair, an appropriate equilibrium between fairness and efficiency is aimed at. The third code allocation procedure, performed by the third code allocation means CAM3 is thereby similar to the fair state or second code allocation procedure, but instead of allocation only one code to one terminal at a time, a predetermined number of codes are allocated to one terminal. This predetermined number is denoted n and is as well calculated by the calculating means CM, for instance by dividing the number of codes by the number of terminals, in case the network is configured such that the result of this division is a number larger than one. n is provided by the calculating means CM to the third code allocation means CAM3. It is evident that in this case another, second, maximum amount of network terminals is assigned a code.

The second and third code allocation procedure can be further refined by taking into account traffic and connection parameters pertaining to individual connections requested by the terminals. These traffic and connection parameters are schematically denoted TCP1, . . . , TCPi, to TCPn for respective terminals T1, . . . , Ti to Tn. In case the connections requested by the individual terminals are characterized by these traffic and connection parameters, these traffic and connection parameters are to be considered as weights during the second and the third code allocation procedures. These traffic and connection parameters represent bandwidth guarantees.

The drawing in FIG. 2 includes for CAM2 and CAM3 two possible sub-code allocation means, respectively denoted cam2s and cam2q for CAM2, and cam3s and cam3q, for CAM3. Cam2s and Cam3s perform the "basic" second and third code allocation procedures, respectively, in case the terminals are to transmit data packets for which no specific traffic and connection parameters are foreseen. The input parameters are then merely the requests, as provided by the request table, and the set of two-dimensional physical constraints.

In case traffic and connection parameters have to be taken into account, TCP1 to TCPn are additionally provided to cam2q and cam3q, respectively. Within CAM2 and CAM3 a discriminating means (not drawn on FIG. 2 in order not to overload the drawing) selecting one of the two sub-algorithms is present.

In other embodiments, cam2s and cam3s can be simply part of cam2q and cam3q, respectively, by letting the weights to have the value 1. Again this is then controlled by means of the discriminating means.

The fourth code allocation means CAM4, adapted to perform the fourth code allocation procedure always has priority on the other three, by means of the fact that the delay parameter is always controlled first, and that, in case the latter exceeds the predetermined threshold value Jmax, the fourth code allocation procedure is always performed. This fourth code allocation procedure is called the exception state algorithm.

This exception state algorithm serves by priority the connections for which the delay bound risks breaking, i.e., the time-out connections. This algorithm reduces the delay parameter J to a predetermined minimum value, in one embodiment corresponding to the predetermined threshold value Jmax. The algorithm performed by CAM4 depends upon the number of time-out connections that must be served. This number is calculated based upon the connection delay parameters, either directly provided by the connection admission control memory CACm, or indirectly based on the pseudo-requests calculated by the request table RT.

The latter version is shown in FIG. 2, with the arrow with reference Rcbr representing the pseudo-requests as delivered from the request table.

Based on this number, and taking into account the set of two-dimensional constraints Phy, a maximum number q of codes that can be allocated to a connection is again calculated within CAM4. This is followed by serving the connections in a similar way as CAM3 did,but now with q in stead of n.

In FIG. 2, the third code allocation means CAM3 is selected for performing the calculating of the multipermit at a particular timeslot. The resulting multipermit is designated as {G1(C1,Cm);Gi(Cj)} and thus includes, by way of example a first terminal grant G1 for terminal T1, with codes C1 and Cm assigned to this terminal, and a second terminal grant Gi for terminal T1, with code Cj assigned to Ti.

At the terminal side, e.g., network terminal Ti, the network terminal includes extraction means, adapted to extract from the incoming bitstream of multi-permits, the grants associated to this network terminal. Furthermore this extraction means has to extract from the network terminal grant, the code included therein. The network terminal also includes coding means that is adapted to encode data packets queued in the terminal, with the extracted code, before upstream transmission of the encoded data packets to the central station.

In a more sophisticated variant of the method, not only grants including codes per terminal are calculated, but the code itself is allocated to a storage queue within the network terminal. These storage queues within the terminals are shown on FIG. 3 and denoted TiQ1 to TiQk. These storage queues serve to temporarily store upstream data packets, in accordance to the their associated service categories. For ATM data packets, these service categories are standardized by the ATM Forum specification AF-TM-0056.000 dated April 96. The codes calculated by the medium access controller are then not only allocated to a network terminal, but to one of the storage queues within the network terminal. The algorithm described in the previous paragraphs for calculating the multipermits basically remain the same, but are now based on requests per storage queues in stead of on requests per terminal. The set of two-dimensional constraints however remains at the terminal level, since of course no physical interference between the queues within one terminal is to be expected. The different code allocation means, receiving requests or pseudo-requests per service category and per terminal, in this case of course need to take this fact into account. Additional algorithms group the requests per terminal, taking into account the physical interference aspect, while further considering them apart in order to optimally divide the available codes per storage queue and per timeslot.

Figure 3:
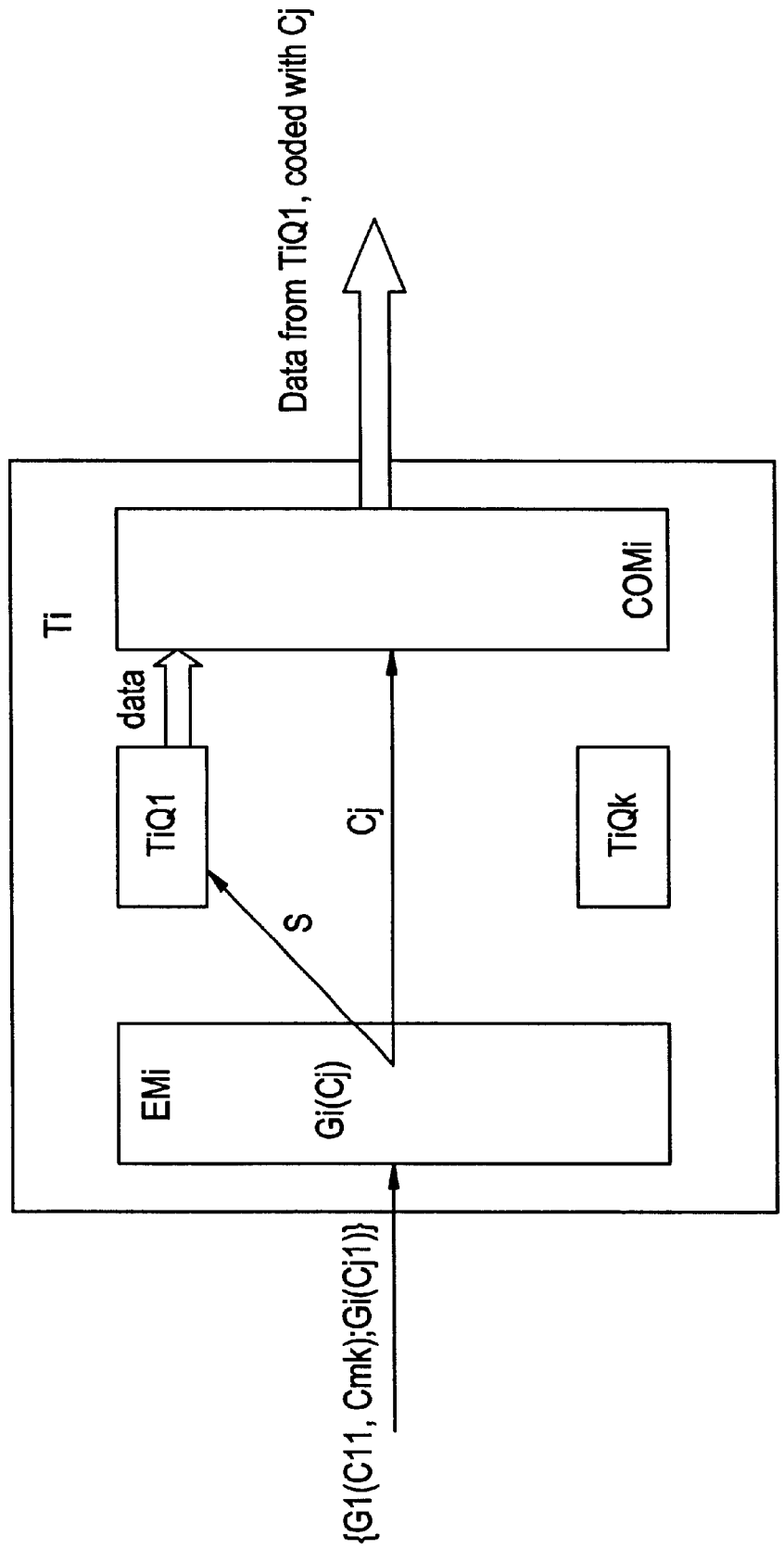
FIG. 3 represents a network terminal of the communications network of FIG. 1, according to the invention.

At the terminal side, the extraction means, denoted Emi in FIG. 3, was already adapted to extract from the bitstream of multipermits, the associated network terminal grant. In FIG. 3 such a multipermit is denoted as {G1(C11,Cmk);Gi(Cj1)}, indicating that this multipermit includes a grant for network terminal 1, this grant including two codes: a first one for storage queue 1, with code C1, and a second one for storage queue k, with code Cm. Similarly, network terminal grant Gi for Ti, includes code Cj, for storage queue TiQ1. The extraction means Emi is than further adapted to extract this code and the associated storage queue from the network terminal grant. The extracted code Cj is consecutively transmitted to the coding means COMi, whereas a control signal s is transmitted to the selected storage queue TiQ. Upon receipt of this control signal, data packets are transmitted from TiQ1 to the coding means COMi. The latter will encode these data packets with the code Cj, which are then upstream transmitted to the central station.

While the principles of the invention have been described above in connection with specific apparatus, it is to be clearly understood that this description is made only by way of example and not as a limitation on the scope of the invention, as defined in the appended claims.

What is claimed is:

1. A method to assign upstream timeslots and codes to a network terminal of a plurality of network terminals in a communications network comprising a central station coupled to said plurality of network terminals via the cascade connection of a common transmission channel and respective individual network terminal channels, said network terminals transmitting upstream data packets to said central station in a time multiplexed way over said common transmission channel using said upstream time slots, and said communications network further comprising a medium access controller, said method comprises:

assigning at least one code of a plurality of codes available within said communications network for encoding said upstream data packets to be transmitted by said network terminals for inclusion within a network terminal grant assigned to said network terminal, determining an activity parameter related to the load within said network, determining a delay parameter related to delay sensitive connections within said communications network, determining physical interference parameters related to degrees of synchronization between said network terminals and said individual network terminal channels of said communications network, selecting one of a plurality of code allocation procedures for generating said network terminal grant, the selection being based upon the value of said activity parameter and the value of said delay parameter and said physical interference parameters between said network terminals and said individual network terminal channels of said communications network, generating a network terminal grant, wherein said network terminal grant is generated by said medium access controller and said network terminal grant assigns said upstream time slots to one of said network terminals, and upon receipt of said network terminal grant, said network terminal will encode upstream data packets within said network terminal with said at least one code prior to upstream transmission of said upstream data packets of said network terminal to said central station.

2. The method according to claim 1, wherein said activity parameter is derived from requests transmitted by said network terminals to said medium access controller, and indicative of the amount of upstream data packets said network terminals intend to transmit to said central station.

3. The method according to claim 1, wherein said plurality of code allocation procedures comprises a procedure to reduce said load within said network.

4. The method according to claim 1, wherein said plurality of code allocation procedures comprises a procedure for simultaneously allocating a respective one of said plurality of codes to a respective one of a maximum amount of said network terminals.

5. The method according to claim 4, wherein said procedure uses traffic and connection parameters related to said upstream data packets within said network terminals.

6. The method according to claim 1, wherein said plurality of code allocation procedures comprises a procedure whereby a predetermined amount of respective ones of said codes are simultaneously allocated to a respective one of a maximum amount of said network terminals.

7. The method according to claim 6, wherein said procedure uses traffic and connection parameters related to said upstream data packets within said network terminals.

8. The method according to claim 1, wherein said plurality of code allocation procedures comprises a procedure that reduces said delay parameter within said network to a predetermined minimum value.

9. The method according to claim 1, wherein said method is performed at predetermined instances, and each of these instances results in the generation of a multipermit including one or more of said network terminal grants.

10. The method according to claim 1, wherein said data packets within said network terminal are classified within said network terminal in accordance with their associated service category and temporarily stored in a plurality of storage queues, each storage queue being related to a respective one of said service categories, and said at least one code is assigned to at least one of said storage queues, whereby, upon receipt of said network terminal grant, said network terminal will encode data packets from said at least one of said storage queues with said at least one code prior to upstream transmission of said data packets from said at least one of said storage queues to said central station.

11. A medium access controller for use in a communications network wherein a central station is coupled to a plurality of network terminals via a cascade connection of a common transmission channel and respective individual network terminal channels and said network terminals transmit upstream data packets to said central station in a time multiplexed way over said common transmission channel using upstream time slots, said medium access controller generating network terminal grants for assigning said upstream timeslots to said network terminals and to transmit said network terminal grants to said network terminals, wherein said medium access controller assigns at least one code of a plurality of codes available within said communications network for encoding upstream data packets to be transmitted by said network terminals to a network terminal and to include said at least one code into a network terminal grant assigned to said network terminal and generated by said medium access controller, said medium access controller comprising:
- physical constraint means adapted to determine physical interference parameters related to degrees of synchronization between said network terminals and said respective individual network terminal channels of said communications network,
- load monitoring means for determining an activity parameter related to the load within said network, said medium access controller generating said network terminal grant based upon said activity parameter, and
- jitter determining means adapted to determine a delay parameter related to delay sensitive connections within said communications network, said medium access controller being adapted to generate said network terminal grant based on said delay parameter and said activity parameter.

12. The medium access controller according to claim 11, wherein said load monitoring means receives requests transmitted by said plurality of network terminals to said medium access controller, said requests comprising information related to the amount of upstream data packets said network terminals intend to transmit to said central station, said load monitoring means being adapted to determine said activity parameter from said requests.

13. The medium access controller according to claim 11, wherein said medium access controller is further adapted to generate, at predetermined instances, a multipermit including at least one of said network terminal grants.

14. The medium access controller according to claim 11, wherein said medium access controller is further adapted to assign said at least one code to at least one storage queue of said network terminal.

15. A medium access controller for use in a communications network wherein a central station is coupled to a plurality of network terminals via a cascade connection of a common transmission channel and respective individual network terminal channels and said network terminals transmit upstream data packets to said central station in a time multiplexed way over said common transmission channel using upstream time slots, said medium access controller generating network terminal grants for assigning said upstream timeslots to said network terminals and to transmit said network terminal grants to said network terminals, wherein said medium access controller assigns at least one code of a plurality of codes available within said communications network for encoding upstream data packets to be transmitted by said network terminals to a network terminal and to include said at least one code into a network terminal grant assigned to said network terminal and generated by said medium access controller, said medium access controller comprising:
- physical constraint means adapted to determine physical interference parameters related to degrees of synchronization between said network terminals and said respective individual network terminal channels of said communications network,
- load monitoring means for determining an activity parameter related to the load within said network, said medium access controller generating said network terminal grant based upon said activity parameter
- a plurality of code allocation means, and
- a selection means, said selection means determining which one of said plurality of code allocation means will be activated for determining said network terminal grant.

16. The medium access controller according to claim [20], wherein said plurality of code allocation means comprises a code allocation means for allocating codes such that said load within said network is reduced to a minimum.

17. The medium access controller according to claim 15, wherein said plurality of code allocation means comprises a code allocation means for simultaneously allocating one distinct respective code of said plurality of codes to distinct respective terminals of a maximum amount of said network terminals.

18. The medium access controller according to claim 17, wherein said code allocation means allocates codes based on traffic and connection parameters related to said upstream data packets within said network terminals.

19. The medium access controller according to claim 15, wherein said plurality of code allocation means comprises a code allocation means for simultaneously allocating a predetermined amount of distinct respective codes of said plurality of codes to distinct respective terminals of a maximum amount of said network terminals.

20. The medium access controller according to claim 19, wherein said code allocation means allocates codes based on traffic and connection parameters related to said upstream data packets within said network terminals.

21. The medium access controller according to claim 15, wherein said plurality of code allocation means comprises a code allocation means for allocating codes such that said delay parameter is reduced to a predetermined minimum value.

22. A network terminal for use in a communications network wherein a central station is coupled to a plurality of network terminals including said network terminal, via the cascade connection of a common transmission channel and respective individual network terminal channels, said network terminal comprising:
- extraction means for detecting an associated network terminal grant and extract at least one code within a downstream bitstream of network terminal grants transmitted from a medium access controller included in said communications network, to said network terminals, said network terminal transmitting upstream data packets to said central station upon detection of said associated network terminal grant, said associated network terminal grant being based upon a selected one of a plurality of code allocation procedures for the determination of said associated network terminal grant, the selection of the code allocation procedure being based upon the value of an activity parameter related to the load within said network, the value of a delay parameter related to delay sensitive connections within said network and physical interference parameters related to degrees of synchronization between said network terminals and said individual network terminal channels of said network, and encoding means for encoding said upstream data packets with said at least one code prior to transmitting said upstream data packets to said central station.

23. The network terminal according to claim 22, said network terminal further comprising a plurality of storage queues adapted to store said upstream data packets in accordance to their associated service category, wherein said at least one code is thereby assigned to at least one storage queue of said plurality of storage queues, said extraction means determining from said at least one code said at least one storage queue to which said at least one code is assigned, and said encoding means for encoding upstream data packets from said at least one storage queue prior to before transmitting said upstream data packets from said at least one storage queue to said station.

* * * * *